(12) United States Patent
Smith et al.

(10) Patent No.: US 8,167,962 B2
(45) Date of Patent: May 1, 2012

(54) PULPSTONE FOR LONG FIBER PULP PRODUCTION

(75) Inventors: Glen A. Smith, Hamilton (CA); William E. Bernier, Worcester, MA (US)

(73) Assignees: Saint-Gobain Abrasives, Inc., Worcester, MA (US); Saint-Gobain Abrasifs, Conflans-Sainte-Honorine (FR)

( * ) Notice: Subject to any disclaimer, the term of this patent is extended or adjusted under 35 U.S.C. 154(b) by 432 days.

(21) Appl. No.: 12/100,084

(22) Filed: Apr. 9, 2008

(65) Prior Publication Data

US 2008/0250725 A1    Oct. 16, 2008

Related U.S. Application Data

(60) Provisional application No. 60/922,700, filed on Apr. 10, 2007, provisional application No. 60/958,029, filed on Jul. 2, 2007.

(51) Int. Cl.
*C09K 3/14* (2006.01)

(52) U.S. Cl. .......................................... 51/309; 51/307

(58) Field of Classification Search .................... 51/307, 51/309
See application file for complete search history.

(56) References Cited

U.S. PATENT DOCUMENTS

| | | | |
|---|---|---|---|
| 2,074,114 A * | 3/1937 | Larsson | 451/543 |
| 2,369,639 A * | 2/1945 | Ball et al. | 451/541 |
| 2,544,632 A | 3/1951 | Holter et al. | |
| 3,153,511 A | 10/1964 | Attack et al. | |
| 3,890,072 A | 6/1975 | Barks | |
| 5,035,723 A | 7/1991 | Kalinowski et al. | |
| 5,129,919 A | 7/1992 | Kalinowski et al. | |
| 5,243,789 A | 9/1993 | Bacic | |
| 5,401,284 A | 3/1995 | Sheldon et al. | |
| 5,536,283 A | 7/1996 | Sheldon et al. | |
| 5,573,561 A | 11/1996 | Sheldon et al. | |
| 5,738,696 A | 4/1998 | Wu | |
| 5,738,697 A | 4/1998 | Wu et al. | |
| 6,241,169 B1 | 6/2001 | Bjoerkqvist | |
| 6,679,758 B2 | 1/2004 | Bright et al. | |
| 6,780,804 B2 | 8/2004 | Webber et al. | |
| 6,807,960 B2 | 10/2004 | Steck | |
| 7,067,445 B2 | 6/2006 | Webber et al. | |
| 7,086,938 B2 | 8/2006 | Tuovinen | |
| 2004/0147388 A1 | 7/2004 | Webber et al. | |
| 2006/0283990 A1 | 12/2006 | Lucander et al. | |

FOREIGN PATENT DOCUMENTS

| | | |
|---|---|---|
| CA | 2036534 | 9/1991 |
| DE | 1 592 088 A1 | 12/1970 |
| EP | 0 119 498 A2 | 9/1984 |
| WO | 91/09707 A1 | 7/1991 |

OTHER PUBLICATIONS

International Search Report and Written Opinion of the International Searching Authority dated Jun. 4, 2009, from counterpart International Application No. PCT/US2008/059832, filed on Apr. 10, 2008.
Bjoerkqvist, T et al., "Grinding Surface with an Energy-Efficient Profile," International Mechanical Pulping Conference 2001, pp. 373-380.
Cho, G. et al., "Particle Shape Effects on Packing Density, Stiffness and Strength: Natural and Crushed Sands," Journal of Geotechnical and Geoenvironmental Engineering, vol. 132, No. 5, May 2006, pp. 591-602.
JSC Pulpstone Factory DEFT downloaded from http://www.pulpstone.ru/ on Mar. 29, 2007.
JSC Pulpstone Factory DEFT downloaded from http://www.pulpstone.ru/pulpstones.html on Mar. 29, 2007.
The Pulpstone Guide, Norton Pulpstone, last revision dated Apr. 30, 2007.
International Preliminary Report on Patentability dated Oct. 13, 2009, from counterpart International Application No. PCT/US2008/059832, filed on Apr. 10, 2008.

\* cited by examiner

*Primary Examiner* — Elizabeth Wood
(74) *Attorney, Agent, or Firm* — Abel Law Group, LLP; Joseph P. Sullivan

(57) ABSTRACT

Pulp production techniques are disclosed. In one embodiment, pulpstone segments are provided, that include proppant grits in the place of some or all of the conventional abrasive typically used in pulpstone applications. The proppant or proppant-abrasive mixture can be combined into a three-dimensional matrix supported by a vitrified bond. Alternative embodiments use proppant grits in an organic bond or a metal bond or a cement bond (each of which may also include abrasive grits in addition to proppant grits). The proportion of proppant grits to abrasive grits can be varied to produce pulp of varying fiber length distribution as required by the end-user (e.g., paper mill). The greater the proppant concentration, the less cutting of the fibers by the conventional abrasive will occur, producing a greater percentage content of longer fibers. Such pulp produces higher quality paper.

24 Claims, 4 Drawing Sheets

PULPSTONE FOR LONG FIBER PULP PRODUCTION

RELATED APPLICATION

This application claims the benefit of U.S. Provisional Application Nos. 60/922,700, filed on Apr. 10, 2007, and 60/958,029, filed on Jul. 2, 2007, each of which is herein incorporated by reference in its entirety.

FIELD OF THE INVENTION

The invention relates to pulpstones, and more particularly, to pulpstones configured for producing long fiber pulp.

BACKGROUND OF THE INVENTION

Mechanical pulping is the most efficient method of producing pulp from wood with a yield from raw material of greater than 95%. The use of pulpstones is the oldest and most energy efficient method for the production of mechanical pulp from wood. Pulp produced from wood grinding usually contains more so called fines than pulps from other modes of pulping, resulting in paper with superior properties (e.g., higher opacity and better printability).

In operation, the abrasive grits in the pulpstone pass over fibers in the wood. The compression and release action that results from the grits passing over the fibers, combined with the heat of the process, softens the lignin bond around the fibers. As is known, lignin is the naturally occurring binding agent in wood that that holds cellulose fibers together. As the lignin softens, sheer forces exerted by the grits operate to separate and peel fibers from the wood matrix as the pulpstone rotates. In general, the wood being pulped or defibrated (typically in the form of logs) has a horizontal orientation that is parallel to the axis of rotation of the pulpstone as it is fed onto the pulpstone, and the fibers come away in the transverse direction of rotation. The sheer and consequent peeling are not precisely perpendicular to the orientation of the wood. Rather, the angle of fiber peeling is a function of the pattern on the pulpstone, one of the ways fiber characteristics can be controlled.

One drawback of pulp produced by such conventional processes is the lack of paper strength due to relatively short fibers. The fibers are short, because they tend to break during the mechanical defibration process. To compensate for this drawback, the pulp furnish is typically mixed with chemically produced pulp, which contains longer fibers and provides strength to the paper. However, such chemically produced pulp increases pulp costs and is manufactured by processes that are associated with environmental issues.

There is a need, therefore, for pulp production techniques that produce long fiber pulp.

SUMMARY OF THE INVENTION

One embodiment of the present invention provides a pulpstone segment comprising proppant grits in a bond material. In one such case, the proppant grits have a relative density of less than 98%. In another such case, the proppant grits have a sphericity of 0.7 or higher and a relative density of less than 95%, wherein sphericity is measured per the Kirumbein & Sloss scale. In another such case, the proppant grits have a relative density of less than 93%. In another such case, the proppant grits have a sphericity of 0.9 or higher, wherein sphericity is measured per the Kirumbein & Sloss scale. The pulpstone segment may further include abrasive grits (e.g., extruded sol-gel aluminum oxide abrasives having a cylindrical shape and a hardness of at least 16 GPa). In one such case, the abrasive grits have a relative density 98% or higher and include one or more of alumina, boron carbide, boron nitride, chromia, diamond, silica, silicon carbide, silicon nitride, titania, tungsten carbide, tungsten nitride, and mixtures thereof. The bond material can be, for example, a vitrified bond that matures at 1100° C. or less. Alternatively, the bond material can be a cement bond, or a metal bond. The proppant grits and bond material may be formed a single layer. In one particular case, the pulpstone segment further includes a core upon which a the segment is operatively coupled. The core can be, for example, one of cement or metal, and a plurality of segments can be operatively coupled thereto. Alternatively, the pulpstone segment can be part of a monolithic pulpstone (e.g., a portion of a unitary pulpstone surface as opposed to a discrete segment of a pulpstone). In some cases, the pulpstone segment includes porosity (e.g., induced and/or resulting from bonding together agglomerates containing the proppant grits). In one specific embodiment, the bond material is an inorganic glassy bond that matures at a temperature at 1220° C. or less, and the proppant grits are sintered bauxite or aluminosilicate proppant grits having a sphericity of 0.9 as measured per the Krumbein & Sloss and a relative density of 98% or less.

Another embodiment of the present invention provides a pulpstone repair material that includes proppant grits in a bond material, wherein the proppant grits have a relative density of less than 98%. In one such embodiment, the bond material comprises epoxy resin mixed with the proppant grits, and a hardner, wherein the epoxy resin mixed with proppant grits is combined with the hardner to carry out a pulpstone repair. The repair material can be used to repair, for instance, pulpstone segments (whether discrete segments or a portion of a monolithic pulpstone).

Another specific embodiment of the present invention provides a pulpstone that includes a bond material and proppant grits in the bond material. The proppant grits have a relative density of less than 98% and a sphericity of 0.7 or higher, wherein sphericity is measured per the Kirumbein & Sloss scale. In addition to the proppant grits, the pulpstone further includes abrasive grits having a relative density of 98% or higher. In one such case, the proppant grits have a relative density of less than 93%. Other variations and features previously discussed can be equally applied here. The pulpstone may be configured for producing fibers, such that when subjected to screening in accordance with Bauer-McNett Fiber Fractions, at least 18% of the fibers will pass screens with a slot size of 30 mesh and coarser (or more specifically, at least 20% of the fibers; or even more specifically, at least 23.5% of the fibers). Alternatively, or in addition to, the pulpstone may be configured for producing fibers, such that when subjected to screening in accordance with Bauer-McNett Fiber Fractions, at least 3% of the fibers will pass screens with a slot size of 14 mesh and coarser (or more specifically, at least 4.5% of the fibers). As will be appreciated, the greater the percentage of such fibers that pass coarse screens, the greater the percentage of long fibers.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
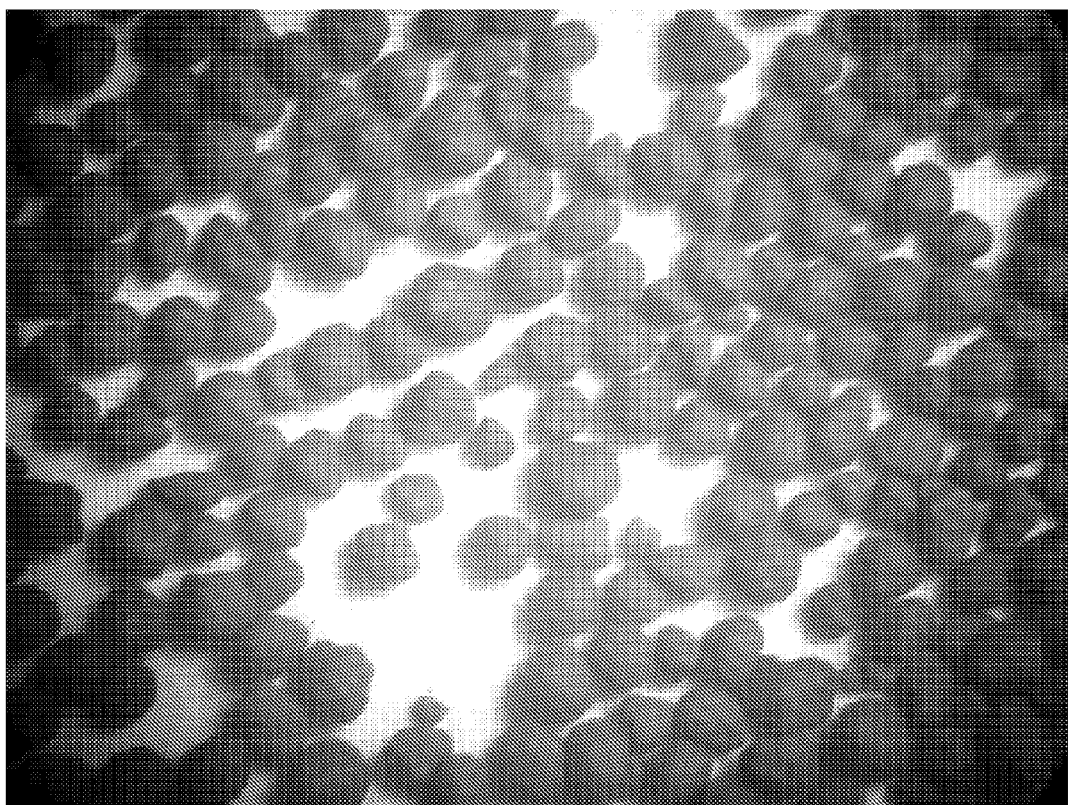
FIG. 1 shows an example proppant that can be used in a pulpstone configured in accordance with one embodiment of the present invention.

Pulp production techniques are disclosed. The techniques can be employed to produce all forms of stone ground wood pulp (e.g., atmospheric stone ground wood or SGW pulp, pressurized ground wood or PGW pulp, super pressurized ground wood or PGWS pulp, chemi pressurized ground wood or CPGW pulp) in all types of atmospheric and pressurized pulp grinders.

General Overview

One embodiment of the present invention is a pulpstone used for mechanical defibration of wood into pulp. The pulpstone includes a defibration agent that produces pulp with a greater percentage of longer pulp fibers than conventional pulpstones. Such conventional pulpstones use abrasive grits that cause shorter pulp strands to result from the defibration process.

As is known, defibration is the process of separating fibers from a wood matrix (e.g., logs, etc). The pulp resulting from a mechanical defibration process using a pulpstone configured in accordance with principles of the present invention, can be used, for example, as a raw material in the production of paper having higher strength properties than would be provided by pulp produced with conventional abrasive grit based pulpstones.

In one particular embodiment, a pulpstone is fabricated by the bonding together of sintered bauxite or aluminosilicate proppant grits in vitrified or ceramic pulpstone segments. The segments can then be fastened to a core to form a pulpstone. U.S. Pat. Nos. 5,243,789 and 7,086,938 each describes a fastening system that can be used to operatively couple the segments to a pulpstone core. The pulpstone core can be, for example, a conventional concrete or metal pulpstone core. Each of these patents is herein incorporated by reference in its entirety. Other suitable fastening systems can also be used, as will be apparent in light of this disclosure. Pulpstones using segments having a proppant grit component produce pulp of superior quality, as compared to pulp produced by conventional pulpstone abrasive grits (e.g., premium grade fused alumina abrasive). In another embodiment, a pulpstone is provided that has segments including sintered bauxite and/or aluminosilicate proppant grits, in addition to an amount of conventional abrasive grits (e.g., silicon carbide and/or aluminum oxide grits) bonded in an inorganic glassy vitrified bond.

A proppant grit is generally referred to herein as a defibration agent, in that it works more gently on the wood fibers than do conventional pulpstone abrasive grits, thereby resulting in longer pulp that produces higher quality paper. In more detail, and as previously described, the grits in the pulpstone surface essentially massage or cyclically compress and release the wood generating internal heat in the wood which softens the lignins and other components of wood allowing successive grits (as they pass over the fibers) to mechanically peel them from the wood matrix. The sharper abrasive grits of conventional pulpstones tend to break much of the fiber being peeled, while proppant grits exert a more gentle peeling force on the fibers, thereby separating a greater percentage of longer fibers. Longer fibers translate to stronger pulp for stronger paper, particularly in tear strength. The proppant grits are particles having a sphericity, for example, of 0.9 or higher (Krumbein & Sloss sphericity). The relative density of the proppant grits is, for example, less than 95% (as compared to conventional abrasive grits, which have a relative density of 98% or higher).

Note that although segmental pulpstones are referred to, other pulpstone configurations can equally benefit from principles of the present invention. For instance, the pulpstone may be designed having a monolithic or otherwise unified defibration area having any suitable bond composition. Segmental designs may simplify manufacturing and repair processes, but are not a necessary requirement for practicing embodiments of the present invention.

Further note that bonds other than vitrified bonds can be used with proppant grits as described herein. Alternative example embodiments include a pulpstone that is fabricated, for example, by plating or brazing a single layer of proppant grits in a metal bond onto a metal pulpstone core (or segments thereof), or a pulpstone that is fabricated by mixing proppant grits into a cement bond, or a pulpstone that is fabricated by mixing proppant grits into an organic bond. A number of factors can be considered in determining a suitable bond type, such as desired stone wear rate and the force at which the stone engages the wood being pulped.

Proppant as a Defibration Agent

Proppant is a product typically used by the oil and gas well industry, and is a granular substance that is carried into crack formations of a given mining area by a fracturing fluid. In such a typical application, proppant operates to keep the cracks open (or "propped" open) after a fracture treatment. Ceramic proppant, for example, of the aluminosilicate chemical family has a good crush resistance and a highly spherical shape, thereby allowing the grits to enter the cracks and maintain shape under great pressure. Proppant grits generally have a lower relative density than conventional pulpstone abrasive grits. In this sense, proppant grits can be distinguished from conventional pulpstone abrasive grits by at least their high sphericity, or their lower relative density, or by a combination thereof. Other differences will be apparent in light of this disclosure (e.g., see various specific commercially available Saint-Gobain proppants and their respective parameters such as crush strength in the previously incorporated U.S. Provisional Application Nos. 60/922,700 and 60/958,029). Information regarding such proppants may also be found on the World Wide Web at: http://www.proppants-.saint-gobain.com (e.g., see proppant data sheets for Ultraprop®, Versaprop®, Interprop®, and Sintered Bauxite products).

In general, proppants are not suitable as an abrasive for grinding materials, as they are relatively soft and round, and have a low relative density. As such, they are not used in bonded abrasive products. Even though a proppant is softer than a conventional abrasive, it has a high crush resistance. As will be apparent in light of this disclosure, the crush strength of proppant grits is sufficient to allow them suitable performance in a defibration process. Crush strength can be measured, for example, according to the American Petroleum Institute Recommended Practice 60 (RP 60), or as discussed in U.S. Pat. Nos. 7,067,445 and 6,780,804. Each of these patents is herein incorporated by reference in its entirety.

In one particular embodiment, ceramic proppant particles are used that have a Kirumbein & Sloss (K&S) sphericity of 0.9 or higher. As is known, K&S sphericity is defined as the diameter of the largest inscribed sphere relative to the diameter of the smallest circumscribed sphere. Such proppants are commercially available, for example, from Saint-Gobain Proppants in various size ranges. Examples include Ultraprop® 20/40, Versaprop® 20/40, Interprop® 12/18, 16/30, 20/40, 30/50, and Sintered Bauxite 16/30, 20/40, and 30/50. All of which have a sphericity of 0.9. Interprop® proppant is also available in 35/140 with a sphericity of 0.7, which may also be used, in accordance with principles of the present invention.

Each of Ultraprop® 20/40 and Sintered Bauxite 16/30, 20/40, and 30/50 has a relative density of about 89.74%. Each Versaprop® 20/40 and Interprop® 12/18, 16/30, 20/40, and 30/50 has a relative density of about 91.43%. As is known, relative density equals actual density (specific gravity) divided by theoretical density. In this case, the theoretical density has been estimated to be about 3.5 for Versaprop® 20/40 and Interprop® 12/18, 16/30, 20/40, and 30/50, and about 3.9 for Ultraprop® 20/40 and Sintered Bauxite 16/30, 20/40, and 30/50.

FIG. 1 shows an example proppant (which happens to be Interprop® 30/50, available from Saint-Gobain Proppants) that can be used in a pulpstone configured in accordance with one embodiment of the present invention. Datasheets showing detailed parameters of each of the proppants mentioned above are included in the previously incorporated U.S. Provisional Application Nos. 60/922,700 and 60/958,029, and are also online at: http://www.proppants.saint-gobain.com. Other proppants, including those sold by companies other than Saint-Gobain, can also be used as described herein, as will be apparent in light of this disclosure. Suitable proppants include, for example, rounded grits made from mullite and corundum (having a % by weight ratio of mullite:corundum ranging from about 15:85 to 85:15).

Proppant Pulpstone

Figure 2:
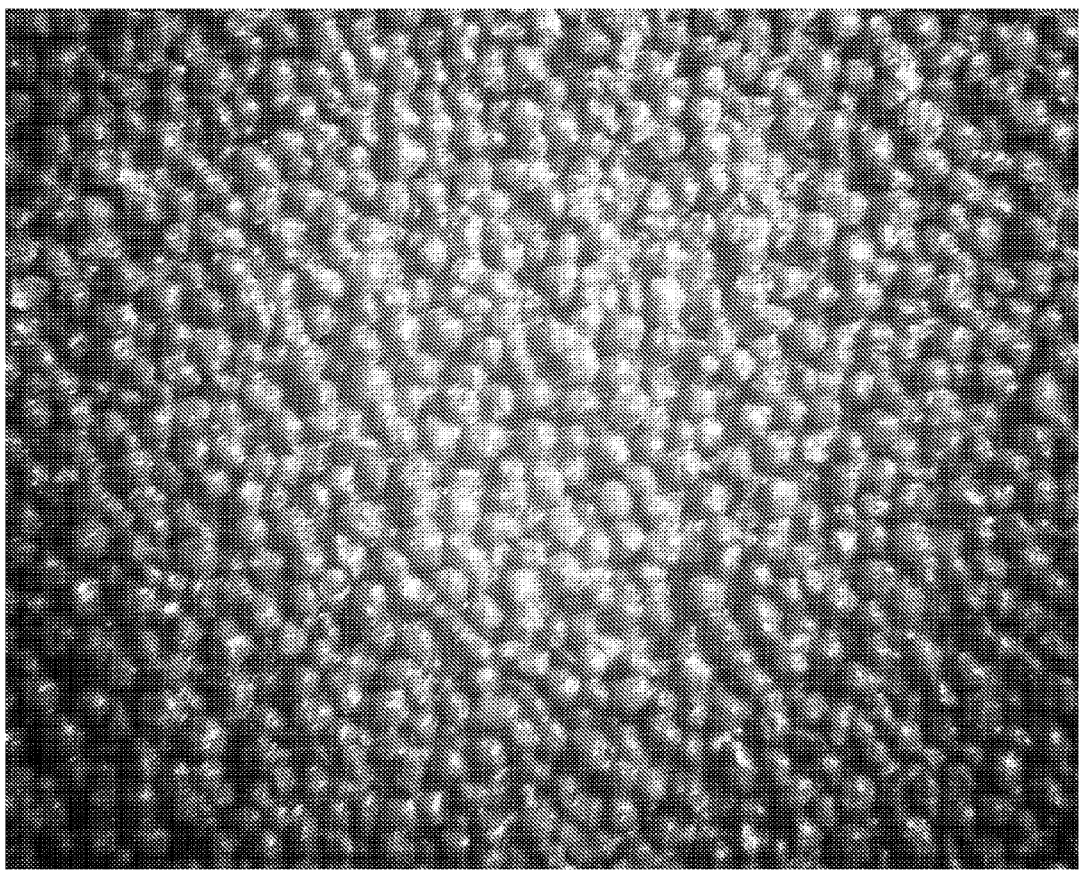
FIG. 2 shows an example of a bonded abrasive pulpstone segment configured with the proppant of FIG. 1, in accordance with one embodiment of the present invention.

As previously explained, a pulpstone segment configured in accordance with an embodiment of the present invention includes proppant grits, which may be in lieu of all conventional abrasive grits, or be mixed at various concentrations with conventional abrasive grits in the usable portion of the pulpstone segment or surface that causes defibration, so as to produce custom fiber distributions specific to customer requirements. The proppant grits, any optional abrasive grits, and bond material (e.g., vitrified or ceramic bond) are pressed together or otherwise formed into a desired segment shape, and fired/heated as needed. A pulpstone can then be assembled by mechanically and/or chemically fastening or otherwise operatively coupling the segments to a core to form the defibration surface. FIG. 2 shows an example of a ceramic bonded abrasive pulpstone segment configured with all proppant, in accordance with one embodiment of the present invention. The specific proppant used in this example is Interprop® 30/50 from Saint-Gobain Proppants.

In another example embodiment having a mix of proppant grits and abrasive grits, the abrasive grit is a sintered sol gel filament shaped alumina based abrasive. Various examples of such an abrasive grit are described in U.S. Pat. Nos. 5,035,723 and 5,129,919. Each of these patents is herein incorporated by reference in its entirety. Such abrasive grits include extruded sol-gel aluminum oxide abrasives having a cylindrical shape and are relatively hard (e.g., hardness of at least 16 GPa). In such an example case, the round cross-section gives the abrasive grits a smooth surface to loosen pulp fibers while the sharp edges release the pulp. Other abrasive grits that could be used (in addition to or as an alternative) are described in U.S. Pat. Nos. 5,738,696 and 5,738,697, each of which is herein incorporated by reference in its entirety. Numerous such example abrasive grits, having varying aspect ratios and ranging from rounded to elongated shapes and other characteristics suitable to long fiber defibration, can be used in conjunction with the proppant grits.

Other typical abrasive grits can be used in combination with the proppant grits, as will be apparent in light of this disclosure. Such typical abrasive grits include, for example, alumina, boron carbide, boron nitride, chromia, diamond, silica, silicon carbide, silicon nitride, titania, tungsten carbide, tungsten nitride, and mixtures thereof. Such abrasive grits generally have a relative density greater than 95%, and usually greater than 98%.

In one example embodiment, the grinding portion of the pulpstone segment has 44 to 54 volume percent abrasive grits and/or proppant grits of which the proppant grit portion comprises at least 10 volume percent and up to 100 volume percent, and 8 to 30 volume percent of vitrified or ceramic bond (e.g., made from clays and frits). Porosity, which may range from 5 to 48 volume percent porosity of the segment in one particular embodiment, can be added to decrease the volume percent of proppant grits (and abrasive grits, if any) by adding pore inducing materials to the bond mix. These pore inducing materials can be, for example, sacrificial organic materials (e.g., crushed walnut shells, flower seeds, wood particles or rosin, polyethylene, acrylic beads, sugar and starch beads) that burn out of the finished product during firing. Alternatively, the pore inducing materials can be inorganic materials (e.g., glass spheres, bubble alumina) that survive firing and remain in the finished product. Dispersoids such as salt can also be used to induce porosity, wherein the salt or other suitable dispersoid is leached out after the wheel is fired.

A specific example embodiment is a pulpstone bonded segment that has about 52 volume percent Saint-Gobain Interprop® 30/50 proppant, about 11.3 volume percent vitrified bond, and about 36.7 volume percent porosity. The formulated weight of proppant used is based on the volume percent and the actual density (specific gravity) of Interprop® 30/50, which happens to be 3.2 g/cc. The Saint-Gobain Interprop® 30/50 proppant has a mean particle diameter of 0.485 mm (other suitable diameters will be apparent in light of this disclosure). The portion of the segment that is not used for grinding may or may not contain proppant (and similarly may or may not contain abrasive grits). Using proppant of a common diameter (or height) provides a more consistent high-low profile, wherein there is a relatively small difference between the high and low spots on the pulpstone's defibration surface (i.e., the surface that contacts the wood being defibrated). In contrast, conventional pulpstones have a significant high-low profile variation due to abrasive grits having different sizes and forms, which causes fiber cutting and lower strength pulp.

The proppant grits can be bonded, for example, using a vitrified bond that matures at 1100° C. or less, and comprises about 25-45% clay binder and 55-75% fused $SiO_2$, ceramic oxides or other suitable frits. This relatively low firing temperature avoids firing growth caused by a reaction of the proppant and the bond at higher firing temperatures (e.g., 1250° C. and greater). Using vitrified/ceramic bonds that mature at less than 1100° C. also avoids slumpage when mixed with proppant grits. In general, the viscosity of the vitrified bond and/or temperature of firing can be selected so as to avoid adverse reaction between the bond and the proppant, while simultaneously providing successful bonding of the proppant grit. Alternatively, the firing temperature of the wheels can be about 1220° C. or less for more viscous high alumina and silica vitrified/ceramic bonds. Such bonds also prevent slumpage and avoid the adverse growth reaction between the proppant grits and the bond. In a more general sense, avoiding firing temperatures of 1250° C. and greater may be necessary, depending on the type of proppant grit and vitrified/ceramic bond composition used. Should proppants become available that can be heated at temperatures exceeding 1250° C. and not succumb to adverse growth reaction or slumpage, then such proppants could be used as discussed herein with bonds having higher firing temperatures. Examples of specific low firing temp vitreous bonds that can be used to form various embodiments of a proppant pulpstone (or segments thereof) as discussed herein are described in U.S. Pat. Nos. 5,401,284, 5,573,561, and 5,536,283. Each of these patents is herein incorporated by reference in its entirety.

In another embodiment, an organic bond pulpstone is provided. The organic bond can be, for example, phenolic resin, rubber, shellac, epoxy, or other such suitable organic bonds. In one specific embodiment, the organic bond can be implemented with the same composition as Capstone™ or Capstone™ Mark III-HG, which are both pulpstone repair materials commercially available from Saint-Gobain Abrasives Canada, Inc. Capstone™ is an organic bonded abrasive in a two part epoxy that includes abrasive grits. Capstone™ can be used, for example, to repair pulpstones, be formed into pulpstone segments, or applied as a thin coating to form a surface on steel segments or a steel core. With respect to specific applications, Capstone™ is typically used to repair pulpstones for atmospheric grinders, and Capstone™ Mark III-HG is typically used to repair pulpstones for pressurized grinders. As will be apparent in light of this disclosure, all or a portion of those abrasive grits in such pulpstone repair materials can be replaced with proppant grits. In one such embodiment, the proppant can be pre-mixed in a container with the epoxy resin, and the hardener can be in a pre-measured smaller container shipped in the container containing the proppant resin mix.

An example of such an organic bond two part epoxy having an "A" component and a "B" component (such as Capstone™ or Capstone™ Mark III-HG) is as follows. The A component is made up of resin and grit (e.g., phenolic resin and proppant grits, or phenolic resin and proppant grits and a conventional aggregate such as sand or aluminum oxide), and the B component is a hardener (e.g., isophorone diamine and n-aminoethylpiperazine). In one specific case of Capstone™ organic bond having proppant grits therein, the ratio of aggregates to resin in the A component is approximately 8.1:1 by weight, and the ratio of A to B is approximately 100:2 by weight. In another specific case of Capstone™ Mark III, the ratio of aggregates to resin in the A component is approximately 5.9:1 by weight, and the ratio of A to B is approximately 100:3 by weight. The weight percent of each component when mixed for Capstone™ is about 87% proppant, 10.8% resin, and 2.2% hardener. The weight percent of each component when mixed for Capstone™ Mark III is about 83.1% proppant, 14.1% resin, and 2.8% hardener. Conventional pulpstone manufacturing techniques can be used to make a pulpstone using such organic bond materials. Note that Capstone™ or Capstone™ Mark III epoxies (or other suitable epoxy) having proppant grits can also be used as a pulpstone repair material (e.g., to repair cement, organic, metal, and vitreous bond pulpstones).

In another embodiment, a cement bond pulpstone is provided. The pulpstone is monolithic in nature (as opposed to segmental), and includes a cement bond (e.g., Portland cement) with proppant grits mixed therein. Just as with a ceramic bond, abrasive grits may be included in the cement bond, if so desired. The proppant grits and abrasive grits (if any) may be distributed throughout the cement bond layer (e.g., from defibration surface to inner diameter), or only to a determined depth from the defibration surface. The cement bond layer can be bonded, for example, to a concrete core or even a metal core if so desired. In one particular embodiment, the mix comprises about 44 to 64 volume percent abrasive grits and/or proppant grits of which the proppant portion comprises 10 volume percent and up to 100 volume percent, and 25 to 45 volume percent of cement bond. Porosity, which may range from 5 to 30 volume percent porosity of the segment, can be added to decrease the volume percent of proppant (and abrasive, if any) by adding pore inducing materials to the bond mix. Note that cement bonded proppant segments can also be formed (as opposed to a monolithic structure), and then operatively coupled (e.g., bolted) to the pulpstone core.

In another embodiment, a metal bond pulpstone is provided. The pulpstone may be monolithic in nature or segmental. Monolithic embodiments may include, for example, a metal core with a single layer of proppant grits and any abrasive grits electroplated, brazed, or otherwise bonded thereon. In one particular such embodiment, a layer of metal bond suitable for brazing (e.g., nickel-copper-tin bond or other suitable metal or combination of metals) is coated on a steel core. The proppant grits and any abrasive grits are then placed on the coated steel core (e.g., grits can be automatically or manually sprinkled or otherwise placed onto the coating). The steel core can then be placed into an oven to wet the braze and bond the proppants and any abrasive grit. Segmental embodiments may include, for example, a plurality of metal segments, each having a single layer of proppant grits and any abrasive grits electroplated, brazed or otherwise bonded thereon. Similar techniques can be used to effect the plating, brazing, etc as with a monolithic embodiment. In one particular embodiment, the segments are relatively flat to effectively hold the abrasive and/or proppant grits until the bond has secured the grits. The segments can then be mechanically (e.g., bolted) and/or chemically (e.g., epoxied) fastened to a core (e.g., concrete or metal) as previously described. Such metal bond embodiments may use, for instance, superabrasives such as diamond and cubic boron nitride in addition to the proppant grits. As with ceramic bond embodiments, metal bonds employed here can be selected that have processing temperatures that avoid adverse reaction between the bond and the proppant, while simultaneously providing successful bonding of the proppant grit (and any abrasive grit).

Thus, the use of proppant grits in wood defibration applications transports more kinetic energy to the wood, raising the wood temperature in the grinding region, softening the lignin, and massaging the wood to separate the fibers without cutting the fibers. This results in the production of a higher ratio of long fibers, increasing the paper strength so less or no chemical pulp is required. The use of a vitreous bond proppant pulpstone also produces usable fiber with less energy and faster defibration rates, relative to conventional pulpstone specifications. Similar benefits apply to organic, cement, and metal bond proppant pulpstones.

Figure 3:
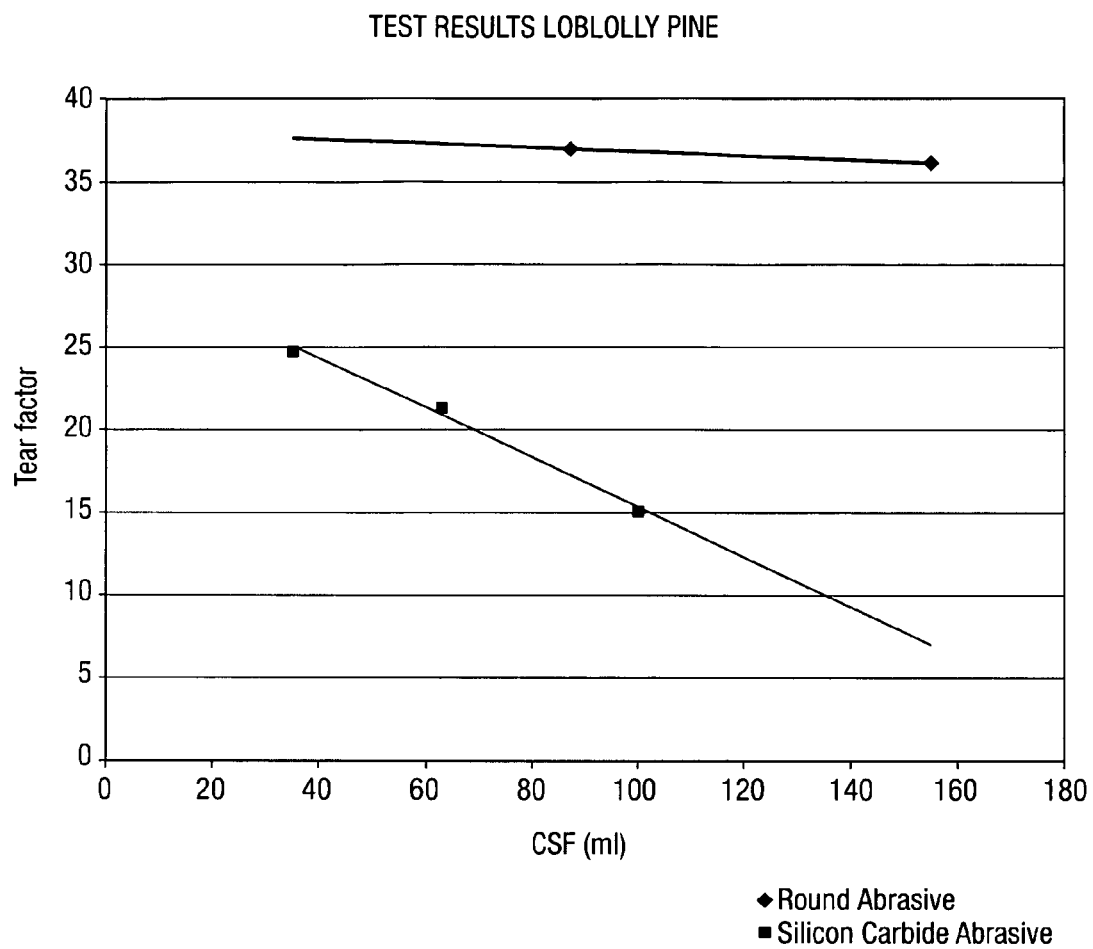
FIG. 3 illustrates pulp test results showing increased tear factor when grinding Loblolly Pine using a pulpstone configured with proppant in accordance with one embodiment of the present invention, relative to the tear factor achieved when grinding Loblolly Pine using a pulpstone configured with conventional abrasive grits.
Figure 4:
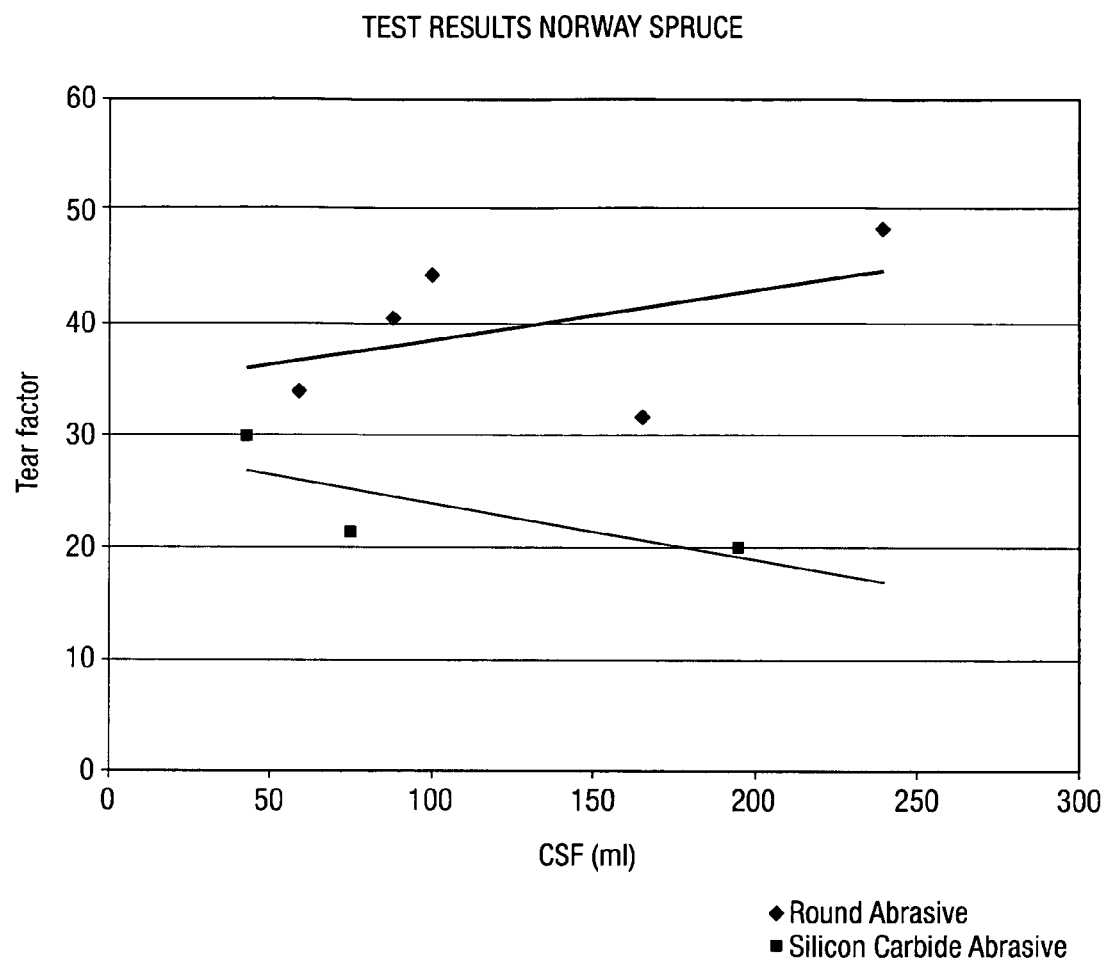
FIG. 4 illustrates pulp test results showing increased tear factor when grinding Norway Spruce using a pulpstone configured with proppant in accordance with one embodiment of the present invention, relative to the tear factor achieved when grinding Norway Spruce using a pulpstone configured with conventional abrasive grits.

FIG. 3 illustrates pulp test results showing increased tear factor when grinding Loblolly Pine using a vitreous bond pulpstone configured with Saint-Gobain Interprop® 30/50 proppant ("round abrasive"), relative to the achieved tear factor when grinding Loblolly Pine using a pulpstone configured with conventional 60 grit silicon carbide abrasive. FIG. 4 illustrates pulp test results showing increased tear factor when grinding Norway Spruce using a vitreous bond pulpstone configured with Saint-Gobain Interprop® 30/50 proppant ("round abrasive"), relative to the achieved tear factor when grinding Norway Spruce using a pulpstone configured with conventional 60 grit silicon carbide abrasive.

The vitreous bond used in both of these example cases is as described in the previously incorporated U.S. Pat. Nos. 5,401,284, 5,573,561, and 5,536,283. In more detail, the raw materials for the example vitreous bond include Kentucky Ball Clay No. 6, nepheline, sodium silicate powder, lithium carbonate, flint, wollastonite, and cobalt spinel. These materials in combination contain the following oxides: $SiO_2$, $Al_2O_3$, $Fe_2O_3$, $TiO_2$, CaO, MgO, $Na_2O$, $K_2O$, $Li_2O$, $B_2O_3$, and CoO. The composition of the pulpstone contains from about 3 to about 25 volume % bond, or more specifically from about 4 to about 20 volume % bond, or even more specifically from about 5 to about 18.5 volume % bond. The vitreous bond after firing contains greater than about 47 weight % $SiO_2$, or more specifically about 52 to about 62 weight % $SiO_2$, or even more specifically about 54 to about 60 weight % $SiO_2$, or even more specifically about 57 weight % $SiO_2$; less than about 16 weight % $Al_2O_3$, or more specifically from about 12 to about 16 weight % $Al_2O_3$, or even more specifically from about 13 to about 15 weight % $Al_2O_3$, or even more specifically about 14.4 weight % $Al_2O_3$; from about 7 to about 11 weight % $Na_2O$, or more specifically from about 8 to about 10 weight % $Na_2O$, or even more specifically about 8.9 weight % $Na_2O$; less than about 2.5 weight % $K_2O$, or more specifically about 0.5 to about 2.5 weight % $K_2O$, or even more specifically from about 1 to about 2 weight % $K_2O$, or even more specifically about 1.6 weight % $K_2O$; greater than about 2.0 weight % $Li_2O$, or more specifically about 2.0 to about 10.0 weight % $Li_2O$, or even more specifically about 2.0 to about 3.4 weight % $Li_2O$, or even more specifically from about 2.0 to about 2.7 weight % $Li_2O$, or even more specifically about 2.2 weight % $Li_2O$; less than about 18 weight % $B_2O_3$, or more specifically from about 9 to about 16 weight % $B_2O_3$, or even more specifically from about 11 to about 14 weight % $B_2O_3$, or even more specifically about 12.6 weight % $B_2O_3$; from about 0 to about 2 weight % CoO, or more specifically about 0.5 to about 1.3 weight % CoO, or even more specifically about 0.9 weight % CoO. Cobalt oxide (CoO) is included as a coloring agent only. The other oxides which are in the vitreous bond, such as $Fe_2O_3$, $TiO_2$, CaO, and MgO are impurities in the raw materials (extraneous). The bond also provides increased mechanical strength with pulpstones made with proppant grits, as well as sol-gel alumina abrasives (such as those described in previously incorporated U.S. Pat. Nos. 5,035,723, 5,129,919, 5,738,696 and 5,738,697). The pulpstones in the green state were fired at a temperature increased 40° C. per hour from room temperature (about 25° C.) to 1000° C., held there for 8 hours, and then cooled to room temperature in a periodic kiln. It will be appreciated that the specific equipment, raw materials, temperatures, and times noted here are for purposes of example only, and may vary from one embodiment to the next. Numerous suitable raw materials, temperatures, times, equipment, etc can be used to produce a fired bond composition. Likewise, it will further be appreciated that materials such as pigments that add color to the bond (e.g., CoO) are optional.

Table 1 illustrates results of a number of standard, internationally recognized tests for specific properties of celulosic pulp used for paper making, and in this particular case, PGW pulp from Finnish Spruce. The equipment and procedures are prescribed and regulated by such entities as the Technical Association of the Pulp and Paper Industry (TAPPI) and the Pulp and Paper Technical Association of Canada (PAPTAC). As can be seen, Table 1 effectively compares pulp produced using a conventional abrasive grit pulpstone and pulp produced using a proppant grit pulpstone configured in accordance with the present invention. Some of the standard tests are performed directly on the pulp samples (e.g., freeness, fiber length, and Bauer-McNett fractions), and other tests are performed on paper sheets manufactured from the pulp samples (e.g., sheet and optical properties). The results shown in Table 1 reflect average results computed from four sample groups.

The proppant grit pulpstone was made with Interprop 30/50 with a calculated 54 volume percent concentration and the ceramic (vitreous) bond previously described at an 8.1 volume % concentration (fired at 1000° C.). The balance of the stone specification was porosity. The stone was a 71"× 49¼" 5WRBS design. The abrasive grit stone has a comparable specification, except that includes abrasive grit (in particular, Alundum grit) instead of proppant grit. It has the same ceramic bond and porosity as the proppant grit stone, and is the same size.

TABLE 1

| | Units | Alundum Grit | Proppant Grit |
|---|---|---|---|
| TESTS | | | |
| FREENESS - CSF | ml | 130 | 107 |
| FIBER LENGTH | mm | 0.94 | 1.04 |
| SHEET PROPERTIES | | | |
| TENSILE | Nm/g | 29.0 | 35.3 |
| TEAR | mN2/g | 3.69 | 4.57 |
| DENSITY | kg/m3 | 350.0 | 377 |
| POROSITY | ml/min | 424.5 | 124.75 |
| OPTICAL PROPERTIES | | | |
| LIGHT SCATTERING | m2/kg | 63.90 | 62.60 |
| LIGHT ABSORPTION | m2/kg | 1.99 | 2.71 |
| BAUER-MCNETT FRACTIONS - % | | | |
| >14 | | 1.72 | 4.73 |
| 14-30 | | 14.35 | 18.95 |
| 30-100 | | 38.63 | 31.58 |
| 100-200 | | 12.55 | 9.50 |
| <200 | | 32.75 | 35.24 |

FREENESS—CSF (Canadian Standard Freeness) is a measure of how quickly water is able to drain from a pulp fiber furnish sample, in a specified period of time. Note the lower freeness of pulp produced with the proppant grit pulpstone, relative to pulp made by the conventional stone. Such lower freeness infers that more energy is imparted to the pulp, which is conducive to the higher strength and density parameter also shown in Table 1. FIBER LENGTH represents the physical lengths of fibers. Note that pulp produced by the proppant grit pulpstone is about 10% longer than pulp fibers produced by the conventional abrasive grit pulpstone. The sheet and optical properties refer to qualities of a paper sheet made from the pulp, and include TENSILE and TEAR strengths, DENSITY and POROSITY, as well as LIGHT SCATTERING, LIGHT ABSORPTION, and Bauer-McNett Fiber Fractions. In more detail, TENSILE strength refers to the strength of a sheet made from the pulp being tested to breakage under tension in a single horizontal direction (i.e., pulling), and TEAR strength refers to the strength of a sample sheet tested to rupture in a perpendicular direction (i.e., tearing). Note the improved tensile and tear strengths of the sheet made from pulp produced with the proppant grit pulpstone, relative to that made by the conventional stone. DENSITY refers to the content, by weight, of fiber in a given volume of the pulp sample being tested, and POROSITY refers to the volume of water that passes through a sample sheet per unit of time. Note the higher density and lower porosity of the sheet made from pulp produced with the proppant grit pulpstone, relative to that made by the conventional stone. LIGHT SCATTERING refers to the way fibers in a sheet reflect light of specific characteristics, and LIGHT ABSORPTION refers to a variation of the LIGHT SCATTERING under different conditions. Each of the stones performed comparably with respect to these tests. Bauer-McNett Fiber Fractions refers to the percentage of a fiber sample retained on various screens of determined mesh. The set of screens ranges from coarse #14 to fine #200 with intermediate screen of progressive mesh. Standard fractions are: >14, 14-30, 30-100, 100-200, and <200, as shown in Table 1. Note the significantly higher percentage amounts of longer fiber pulp that remains on the coarse screens (e.g., >14 and 14-30 screens) for pulp produced with the proppant grit pulpstone, relative to that made by the conventional stone. Note that test results represented in FIGS. 3 and 4 reflect results from a lab grinder, while test results represented in Table 1 reflect an actual mill trial on a full size grinder.

The foregoing description of the embodiments of the invention has been presented for the purposes of illustration and description. It is not intended to be exhaustive or to limit the invention to the precise form disclosed. Many modifications and variations are possible in light of this disclosure. For example, pores can be induced without the use pore inducing materials by using agglomerates of vitrified or organic bond that include proppant grits and optional abrasive grits. A secondary bond material is then used to bond the agglomerates together in an open porous structure. Additional details of example agglomerates and porous structures are provided in U.S. Pat. No. 6,679,758, which is herein incorporated by reference in its entirety. In one such embodiment, proppant grits could be used in place of 10 volume percent and up to 100 volume percent of the abrasive grit volume percent component noted in U.S. Pat. No. 6,679,758. In addition, numerous proppant pulpstone configurations can be implemented, including layered stones, where a first layer includes conventional abrasive grits and a second layer over the first layer includes proppant grits. In this fashion, the stone can be switched from a proppant grit defibration surface to an abrasive grit defibration surface. In the context of a segmented stone, proppant grit segments can be used to replace abrasive grit segments, and vice-versa (e.g., a segmental pulpstone having a reconfigurable defibration surface). It is intended that the scope of the invention be limited not by this detailed description, but rather by the claims appended hereto.

What is claimed is:

1. A pulpstone segment comprising proppant grits in a bond material.
2. The pulpstone segment of claim 1 wherein the proppant grits have a relative density of less than 98%.
3. The pulpstone segment of claim 1 wherein the proppant grits have a sphericity of 0.7 or higher and a relative density of less than 95%, wherein sphericity is measured per the Krumbein & Sloss scale.
4. The pulpstone segment of claim 1 wherein the proppant grits have a relative density of less than 93%.
5. The pulpstone segment of claim 1 wherein the proppant grits have a sphericity of 0.9 or higher, wherein sphericity is measured per the Krumbein & Sloss scale.
6. The pulpstone segment of claim 1 further comprising abrasive grits.
7. The pulpstone segment of claim 6 wherein the abrasive grits include extruded sol-gel aluminum oxide abrasives having a cylindrical shape and a hardness of at least 16 GPa.
8. The pulpstone segment of claim 6 wherein the abrasive grits have a relative density of 98% or higher and include one or more of alumina, boron carbide, boron nitride, chromia, diamond, silica, silicon carbide, silicon nitride, titania, tungsten carbide, tungsten nitride, and mixtures thereof.
9. The pulpstone segment of claim 1 wherein the bond material is a vitrified bond that matures at 1100° C. or less.
10. The pulpstone segment of claim 1 wherein the bond material is one of a cement bond or a metal bond.
11. The pulpstone segment of claim 1 wherein the proppant grits and bond material form a single layer.
12. The pulpstone segment of claim 1 wherein the pulpstone segment is part of a monolithic pulpstone.
13. The pulpstone segment of claim 1 further comprising a core upon which the segment is operatively coupled.
14. The pulpstone segment of claim 13 wherein the core is one of cement or metal, and a plurality of segments are operatively coupled thereto.
15. The pulpstone segment of claim 1 further comprising porosity.
16. The pulpstone segment of claim 1 wherein the bond material is an inorganic glassy bond that matures at a temperature at 1220° C. or less, and the proppant grits are sintered bauxite or aluminosilicate proppant grits having a sphericity of 0.9 as measured per the Krumbein & Sloss and a relative density of 98% or less.
17. A pulpstone repair material comprising proppant grits in a bond material, wherein the proppant grits have a relative density of less than 98%.
18. The pulpstone repair material of claim 17 wherein the bond material comprises epoxy resin mixed with the proppant grits, and a hardner, wherein the epoxy resin mixed with proppant grits is combined with the hardner to carry out a pulpstone repair.
19. A pulpstone comprising:
a bond material; and
proppant grits in the bond material, and having a relative density of less than 98% and a sphericity of 0.7 or higher, wherein sphericity is measured per the Krumbein & Sloss scale; and
abrasive grits having a relative density of 98% or higher.
20. The pulpstone of claim 19 wherein the proppant grits have a relative density of less than 93%.
21. The pulpstone segment of claim 1 wherein the pulpstone segment does not include abrasive grits other than proppant grits.
22. The pulpstone segment of claim 1 wherein a grinding portion of the pulpstone segment comprises 44 to 54 volume percent abrasive grits and/or proppant grits, of which the proppant grits portion comprises at least 10 volume percent and up to 100 volume percent, 8 to 30 volume percent of vitrified or ceramic bond and 5 to 48 volume percent porosity.
23. A pulpstone for mechanical defibration of wood comprising a pulpstone surface or segment fastened or bonded to a core, the pulpstone surface or segment including proppant grits in a bond material.
24. A pulpstone for mechanical defibration of wood, wherein the pulpstone is monolithic and comprises proppant grits in a bond material, said proppant grits and bond material being bonded to a core.

* * * * *